Patented Nov. 10, 1931

1,831,409

UNITED STATES PATENT OFFICE

FRANK CROSSLEY, OF CLEVELAND, OHIO, ASSIGNOR TO MILNESIA LABORATORIES INCORPORATED, OF CLEVELAND, OHIO, A CORPORATION OF DELAWARE

PROCESS OF PREPARING MAGNESIUM OXIDE IN TABLET FORM

No Drawing. Application filed November 20, 1925. Serial No. 70,409.

This invention relates to the preparation of magnesia (MgO) of low specific gravity, and especially to the preparation of such magnesia from condensed milk of magnesia $(Mg(OH)_2)$, and has for its general object to provide a light flocculent, smooth form of such product which may be and which preferably is compressed into the form of a wafer or tablet and which, when brought into contact with water or saliva, will produce pure magnesium hydrate having the same physical and chemical properties as the standard liquid milk of magnesia from which it was produced. A further object of the invention is to provide a product of the character referred to which is readily hydrated or convertible into such pure milk of magnesia when so brought into contact with water or saliva.

In practicing my process, I employ pure prepared precipitated milk of magnesia, or prepare such pure milk of magnesia by any standard method of precipitating the hydrate of magnesium from a magnesium salt by a hydrate (such as sodium hydrate or potassium hydrate), taking care that the precipitants are both free from impurities—especially iron. The milk of magnesia thus obtained is allowed to stand and settle and, after as much as possible of the mother liquid has been run off, the remaining precipitate of hydrate of magnesia is filtered through a filter press, care being taken to avoid the inclusion of any impurities which may have been separated out. Most of the moisture will be removed from the magnesium hydrate in the filter press. If desired, the soft mass of magnesium hydrate (condensed milk of magnesia) from the press may be dried with gentle heat, and dehydrated after all of the moisture has thus been removed; or the moisture remaining after the filter-press operation may be removed by the dehydrating operation. It is important, however, that, in dehydrating, the condensed milk of magnesia shall not be unduly heated nor heated for too long a period of time, but that it shall be heated at as low a temperature as possible and for as short a time as possible consistent with securing such dehydration.

The temperature which I have employed for such dehydration is from about 350° F. to 400° F., which will heat the magnesium hydrate to a dull red heat. By limiting as far as possible both the temperature and the duration of the heating step, consistent with the perfect dehydration of the mass, a fine, light, flocculent, smooth powder of magnesia (MgO) of low specific gravity is produced which, when brought in contact with water or saliva, will immediately form hydrate of magnesia (milk of magnesia), which will be absolutely pure, smooth and free from anything of an irritating nature. Failure to dehydrate in the manner described will lead to the production of magnesia which is of a crystalline nature and of a high specific gravity and which, when brought into contact with water or saliva, will slowly form a gritty hydrate which is unsuitable for the purposes for which standard milk of magnesia is employed.

After having been prepared in the manner described, the magnesia may be flavored with wintergreen, mint, or other flavoring matter; sweetened with saccharine, if desired; granulated with alcohol, thereby to avoid hydration of the product, which would impair the stability thereof and of the wafers or tablets into which it may be formed; and mixed with a minute proportion of a suitable binder (for instance a trace of gum acacia)—after which the magnesia may be compressed into tablets or wafers.

The most convenient manner of applying the binding agent is by dissolving the same in the alcohol which is employed for the purpose of granulating the magnesia, this granulation being resorted to in order to impart a consistency to the magnesia which will enable the particles to adhere to one another (in conjunction with the binder) when compressed into tablets or wafers. Where wood alcohol is employed for the purpose of granulating the magnesia, it will ordinarily contain a sufficient quantity of harmless gummy compounds as impurities to make it unnecessary to dissolve any special binder therein. As the alcohol employed for granulation is entirely evaporated from the magnesia, the use of wood alcohol for this purpose is permissible.

It is preferred to compress the magnesia into tablets or wafers of a size which, when brought into contact with water or saliva, will yield about two teaspoonfuls of milk of magnesia, U. S. P. It has been found that a comparatively small tablet or wafer of this magnesia will yield this amount of hydrate of magnesia or milk of magnesia.

Magnesia produced in the manner described herein will yield a light, amorphous and flocculent hydrate or milk of magnesia, free from impurities, and particularly useful in the treatment of ulcerated stomach; whereas milk of magnesia made from magnesia prepared by calcining the carbonates, or from magnesia made by the excessive heating or dehydration of milk of magnesia, will, by virtue of its gritty nature, be unsuitable for such use, being incapable of immediate and complete hydration and having a tendency to irritate delicate membranes by reason of its tendency to form a granular or gritty compound when subjected to water or saliva.

By making up the magnesia in the form of tablets or wafers, a dosage corresponding to two teaspoonfuls of pure standard milk of magnesia may be administered and retained under circumstances which would produce nausea were the milk of magnesia administered in its ordinary form.

Where saccharin is used, it will be added to the magnesia in the proportion of about 1/250 grain to the magnesia used in making one wafer or tablet. When a flavoring is used, such as oil of wintergreen or mint, it will be added to the magnesia in the proportion of about 1/8 grain of such oil to the magnesia used in making one tablet or wafer.

Reference has been made hereinbefore to the necessity for avoiding the presence of iron in the condensed milk of magnesia from which the magnesium oxide is to be produced. This is because the presence of such iron will change the physical characteristics of the resultant oxide, making it gritty and crystalline and incapable of immediate and complete hydration, as pointed out hereinbefore in connection with the preparation of magnesia by calcining the carbonates of magnesium.

Having thus described my invention, what I claim is:

1. The process of making prepared magnesia tablets or wafers of a non-gritty character which consists in heating condensed precipitated milk of magnesia at a temperature and for a period of time merely sufficient to produce complete dehydration thereof, granulating the resultant magnesia with alcohol, mixing such magnesia with a binder, and compressing the resultant magnesia into tablets or wafers.

2. The process of making prepared magnesia tablets or wafers of a non-gritty character which consists in heating condensed precipitated milk of magnesia at a temperature and for a period of time merely sufficient to produce complete dehydration thereof, treating the resultant magnesia with alcohol and a binder, and compressing the resultant magnesia into tablets or wafers.

In testimony whereof, I hereunto affix my signature.

FRANK CROSSLEY.